(12) United States Patent
Meyer et al.

(10) Patent No.: US 9,683,656 B2
(45) Date of Patent: Jun. 20, 2017

(54) DIAGNOSTICS FOR CLUTCH TORQUE ESTIMATION

(71) Applicant: Ford Global Technologies, LLC, Dearborn, MI (US)

(72) Inventors: Jason Meyer, Canton, MI (US); Gregory Michael Pietron, Canton, MI (US); Diana Yanakiev, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 14/696,580

(22) Filed: Apr. 27, 2015

(65) Prior Publication Data

US 2016/0312884 A1     Oct. 27, 2016

(51) Int. Cl.
*F16H 61/02* (2006.01)

(52) U.S. Cl.
CPC . *F16H 61/0213* (2013.01); *F16H 2061/0223* (2013.01); *F16H 2061/0227* (2013.01)

(58) Field of Classification Search
None
See application file for complete search history.

(56) References Cited

U.S. PATENT DOCUMENTS

| 6,173,226 | B1 | 1/2001 | Yoshida et al. |
| 7,949,453 | B2 | 5/2011 | Parigger et al. |
| 8,214,116 | B2 | 7/2012 | Whitton |
| 2006/0224291 | A1* | 10/2006 | Geist ............... B60W 10/06 701/51 |
| 2012/0316738 | A1* | 12/2012 | Teslak ............... F16H 59/16 701/53 |
| 2013/0345022 | A1 | 12/2013 | Yanakiev et al. |

FOREIGN PATENT DOCUMENTS

EP     1559923 B1    2/2007

* cited by examiner

*Primary Examiner* — Edwin A Young
(74) *Attorney, Agent, or Firm* — James Dottavio; Brooks Kushman P.C.

(57) ABSTRACT

A transmission for a vehicle includes a plurality of clutches that are individually selectively engaged to establish particular power flow paths. The amount of torque flowing through any clutch can be estimated while the clutch is being engaged, being disengaged, or being held locked. The estimated magnitude of clutch torque aids in proper control of the transmission, including how and when to shift between gears. A method and system for determining the uncertainty of estimated clutch torque is provided. Based on the magnitude of uncertainty of estimated clutch torque, the shift schedule can alter to specifically avoid actions that would increase the uncertainty, or the time between shifting gears can increase to reduce the effects of the uncertainty.

17 Claims, 11 Drawing Sheets

DIAGNOSTICS FOR CLUTCH TORQUE ESTIMATION

TECHNICAL FIELD

This disclosure relates to the field of vehicle controls. More specifically, this disclosure relates to altering transmission operation based on determined accuracies of clutch torque estimations.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

A common type of automatic transmission includes a gearbox capable of alternately establishing a fixed number of power flow paths, each associated with a fixed speed ratio. The gearbox includes a number of shift elements such as clutches and brakes. A particular power flow path is established by engaging a particular subset of the shift elements. To shift from one power flow path to another power flow path with a different speed ratio, one or more shift elements must be released while one or more other shift elements must be engaged. Some shift elements are passive devices such as one way clutches, while other shift elements engage or disengage in response to commands from a controller. For example, in many automatic transmissions, the shift devices are hydraulically controlled friction clutches or brakes. The controller regulates the torque capacity of the shift element by regulating an electrical current to a solenoid, which adjusts a force on a valve which, in turn, adjusts a pressure in a hydraulic circuit.

A modern automatic transmission is controlled by a microprocessor which adjusts the torque capacity of each shift element, including any lock-up clutch, at regular intervals. At each interval, the controller gathers information indicating the driver's intent, such as the positions of the shifter (PRNDL), the accelerator pedal, and the brake pedal. The controller also gathers information about the current operating state of the vehicle, such as speed, and of the engine. Increasingly, information is also available from other sources, such as anti-lock brake controllers and GPS systems. Using this information, the controller determines whether to maintain the currently established power flow path or to shift to a different power flow path. If the controller decides to shift to a different power flow path, the controller then adjusts the torque capacities of the off-going shift elements and the on-coming shift elements in a coordinated manner in order to make the transition as smooth as possible.

The control of the clutches in the transmission can be based on a pressure-based control or a torque-based control. In a torque-based control scheme, the desired clutch torque is can be converted to a pressure command using a feed-forward controller that transforms torque into pressure and optionally compensates for clutch dynamics.

SUMMARY

According to one embodiment, a method of operating a transmission is provided. The method first includes operating the transmission according to a first shift schedule for a given driving condition. The method then includes operating the transmission according to a second, different shift schedule for the given driving condition in response to a magnitude of uncertainty of estimated clutch torque.

Operating the transmission according to the second shift schedule may occur in response to the magnitude of uncertainty of estimated clutch torque exceeding a threshold for a predetermined time.

The magnitude of uncertainty in clutch torque may be stored in memory. Operating the transmission according to the second shift schedule may include avoiding the particular gear in which the uncertainty occurs in based on the stored magnitude of uncertainty of clutch torque while transitioning into the particular gear.

According to another embodiment, another method of operating a transmission is provided. The method includes first operating the transmission in a plurality of gears using a plurality of clutches. The method then includes increasing a shift time between gears based on a calculated uncertainty of estimated clutch torque to reduce the uncertainty of estimated clutch torque.

According to yet another embodiment, a transmission assembly for a vehicle is provided. The transmission assembly includes a transmission having a plurality of clutches configured to selectively operate the transmission in a plurality of gears. The transmission assembly also includes a controller programmed to (i) control one or more of the clutches according to a first set of instructions, and (ii) control the one or more clutches according to a second set of instructions in response to a magnitude of uncertainty of estimated clutch torque exceeding a threshold.

DETAILED DESCRIPTION

Figure 1:
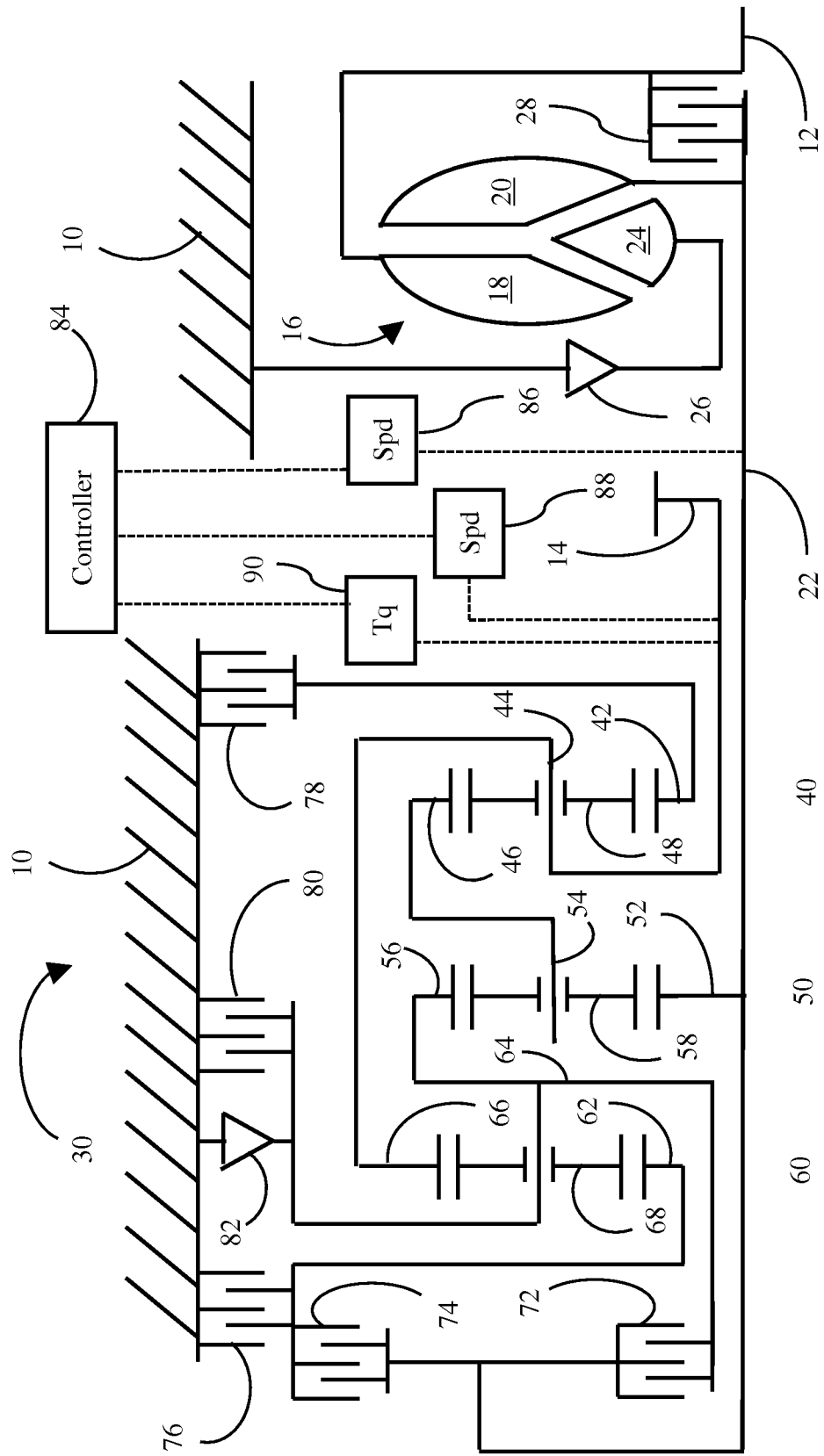
FIG. 1 is a schematic representation of a transmission.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Controlling a hydraulically actuated automatic transmission requires manipulating a number of pressure commands to achieve a desired result. The desired result may be, for example, an upshift or downshift with particular torque and speed characteristics as a function of time. For an upshift, for example, the desired result may be a torque transfer phase that takes a specified amount of time, followed by a specified speed ratio vs. time profile during the inertia phase. In open loop control, the controller uses a model of the transmission to calculate what pressure commands will produce the desired result and then commands those pressure values. The model may be an empirical model based on testing a representative transmission or may be derived from physical laws and nominal transmission characteristics such as dimension. However, the actual behavior of the transmission may differ from the model for several reasons. First, there are part to part variations among transmissions of the same design. Second, a particular transmission varies over time due to gradual wear or unusual events. Third, the transmission responds to a large number of environmental factors such as temperature, atmospheric pressure, etc.

To improve control in the presence of these variations, called noise factors, a controller may utilize closed loop control. Closed loop control improves the result within a particular event, such as a shift. In closed loop control, the controller measures the property that defines the desired behavior, such as speed ratio. The difference between the measured value and a target value is called the error. The commanded pressure is set to the open loop term plus one or more closed loop terms. A proportional term (p term) is proportional to the error, a derivative term (d term) is proportional to the derivative of the error, and an integral term (i term) is proportional to an integral of the error. Each closed loop term has a coefficient of proportionality. These coefficients are set during calibration such that, despite the presence of noise factors, the result converges rapidly toward the desired behavior with minimal oscillation.

Adaptive control improves the result over a number of events. After an event, the controller utilizes the measurements made during the event to revise the model. (Sometimes this is done implicitly rather than explicitly, such as by modifying the open loop terms.) As the model becomes more representative of the particular transmission and the present conditions, the open loop control of future events becomes better. This minimizes the error that the closed loop terms need to accommodate.

Both closed loop control and adaptive control require measurement or estimation of the properties that define the desired behavior. Ideally, this would be accomplished by having a separate sensor for each property. Unfortunately, sensors add cost and weight to a design and introduce failure modes. Also, some parameters are difficult to measure because the sensor would need to be buried in an inaccessible location of the transmission. Consequently, in practice, the number and type of sensors is restricted. When there is no sensor for the property that defines the desired behavior, a model may be utilized to estimate the value based on the available measured properties. These models are subject to the same types of noise factors as the models used to compute the open loop terms. Furthermore, a model may include assumptions that make it valid only under certain operating conditions, such as when in 2nd gear. In order to estimate the property in all of the relevant operating conditions, the controller may need to use multiple models. In some operating conditions, more than one of the models may be valid, leading to possibly conflicting estimates. In such cases, the controller must determine which estimate to trust. The controller may use the trusted model to revise the other models in order to improve the estimate in operating conditions in which the trusted model is unusable.

A number of models will be discussed with reference to a particular transmission layout. Methods of utilizing these models to estimate unmeasured parameters are discussed with reference to a particular collection of available sensor readings. Finally, methods of adapting the models are discussed. Although the discussion references a particular transmission layout and sensor array, a person of skill in the art may apply the methods discussed to different transmission layouts and sensor arrays.

FIG. 1 illustrates a representative front wheel drive automatic transmission. The transmission is contained in a housing 10 that is fixed to vehicle structure. An input shaft 12 is driven by the vehicle engine. The input shaft may be connected to the engine via a damper that isolates the transmission from engine torque pulsations. An output element 14 drives vehicle wheels. The output element 14 may be driveably connected to the wheels via final drive gearing and a differential. The final drive gearing transmits the power to a parallel axis and multiplies the torque by a fixed final drive ratio. The final drive gearing may include layshaft gears, a chain and sprockets, and/or planetary gearing. The differential divides the power between left and right front wheels while permitting slight speed differences as the vehicle turns. Some vehicles may include a power take-off unit that transfers power to rear wheels.

A torque converter 16 has an impeller 18 fixed to input shaft 12 and a turbine 20 fixed to turbine shaft 22. Torque converter 16 transmits torque from input shaft 12 to turbine shaft 22 while permitting turbine shaft 22 to rotate slower than input shaft 12. When turbine shaft 22 rotates substantially slower than input shaft 12, a torque converter stator 24 is held against rotation by one way clutch 26 such that the torque applied to turbine shaft 22 is a multiple of the torque supplied at input shaft 12. When the speed of turbine shaft 22 approaches the speed of input shaft 12, one way clutch 26 overruns. Torque converter 16 also includes a lock-up clutch 28 that selectively couples input shaft 12 to turbine shaft 22.

Gear box 30 establishes a number of speed ratios between turbine shaft 22 and output element 14. Specifically, gear box 30 has three planetary gear sets and five shift elements that establish six forward and one reverse speed ratio. Simple planetary gear sets 40, 50, and 60 each have a sun gear (42, 52, 62), a carrier (44, 54, 64), and a ring gear (46, 56, 66) that rotate about a common axis. Each planetary gear set also includes a number of planet gears (48, 58, 68) that rotate with respect to the carrier and mesh with both the sun gear and the ring gear. Carrier 44 is fixedly coupled to ring gear 66 and output element 14, carrier 54 is fixedly coupled to ring gear 46, ring gear 46 is fixedly coupled to carrier 64, and sun gear 52 is fixedly coupled to turbine shaft 22.

The various speed ratios are established by engaging various combinations of shift elements. A shift element that selectively holds a gear element against rotation may be called a brake whereas a shift element that selectively couples two rotating elements to one another may be called a clutch. Clutches 72 and 74 selectively couple turbine shaft 22 to carrier 64 and sun gear 62, respectively. Brakes 76 and 78 selectively hold sun gear 62 and sun gear 42, respectively, against rotation. Brake 80 selectively holds carrier 64 against rotation. Finally, one way clutch 82 passively holds carrier 64 against rotation in one direction while allowing rotation in the opposite direction. Table 1 illustrates which shift elements are engaged to establish each speed ratio.

TABLE 1

|  | 72 | 74 | 76 | 78 | 80/82 | Ratio | Step |
|---|---|---|---|---|---|---|---|
| Reverse |  | X |  | X |  | −3.00 | 71% |
| 1st |  |  |  | X | X | 4.20 |  |
| 2nd |  |  | X | X |  | 2.70 | 1.56 |
| 3rd |  | X |  | X |  | 1.80 | 1.50 |
| 4th | X |  |  | X |  | 1.40 | 1.29 |
| 5th | X | X |  |  |  | 1.00 | 1.40 |
| 6th | X |  | X |  |  | 0.75 | 1.33 |

Shift elements 72-80 may be hydraulically actuated multi-plate wet friction clutches or brakes. As part of the transmission assembly, a controller 84 controls the pressure of transmission fluid routed to each shift element. This controller may adjust an electrical current to one or more variable force solenoids to control the pressure supplied to each clutch. When pressurized fluid is first supplied to a shift element, it moves a piston into a stroked position. Then, the piston forces the plates together causing the shift element to transmit torque. The torque capacity is negligible until the piston reaches the stroked position. Once the piston reaches the stroked position, the torque capacity increases approximately linearly with the fluid pressure. When the pressure is relieved, a return spring moves the piston to a released (not stroked) position. The controller receives signals from a turbine speed sensor 86, an output speed sensor 88, and an output torque sensor 90.

In order to estimate the speeds of particular elements and the torques on particular elements to the values measured by sensors 86-90, models are needed. Such models may be derived based on the speed and torque relationships of each of the components disregarding any parasitic power losses. If a group of components that are fixedly coupled to one another is modeled as a rigid element, then the sum of the torques exerted on that group, called a shaft, is proportional to the rotational acceleration of the shaft. The coefficient of proportionality is called the rotational moment of inertia, J, which can be estimated based on the dimensions and material density or can be measured experimentally.

$$\Sigma \tau = Ja$$

Gearbox 30 of FIG. 1 has six such shafts: turbine shaft 22 and sun 52; sun 42; output 14, carrier 44, and ring 66; carrier 54 and ring 46; carrier 64 and ring 56; and sun 62.

Disregarding parasitic losses, the speeds of the elements of a planetary gear set and their relative torques are related to the number of teeth on the sun gear, $N_{sun}$, and the number of teeth on the ring gear, $N_{ring}$. Specifically, for a simple planetary gear set, $$N_{sun}\omega_{sun} + N_{ring}\omega_{ring} = (N_{sun} + N_{ring})\omega_{carrier}$$

$$N_{ring}\tau_{sun} = N_{sun}\tau_{ring}$$

$$\tau_{sun} + \tau_{carrier} + \tau_{ring} = 0$$

For a double-pinion planetary gear set, $$N_{ring}\omega_{ring} - N_{sun}\omega_{sun} = (N_{ring} - N_{sun})\omega_{carrier}$$

$$N_{ring}\tau_{sun} = N_{sun}\tau_{ring}$$

$$\tau_{sun} + \tau_{carrier} + \tau_{ring} = 0$$

A friction clutch selectively couples two elements, called the hub and the shell. In the examples herein, the top edge of the clutch symbol in FIG. 1 will be treated as the shell and the bottom edge of the symbol will be treated as the hub, although the choice is arbitrary. The torques applied to each element are a function of the clutch torque capacity, $\tau_{cap}$, and relative speeds of the elements. Specifically, $$\begin{cases} \tau_{hub} = \tau_{cap} \text{ if } \omega_{hub} < \omega_{shell} \\ \text{abs}(\tau_{hub}) <= \tau_{cap} \text{ if } \omega_{hub} = \omega_{shell} \\ \tau_{hub} = -\tau_{cap} \text{ if } \omega_{hub} > \omega_{shell} \end{cases}$$

$$\tau_{hub} + \tau_{shell} = 0$$

Disregarding parasitic losses, the torque capacity of a released clutch is zero.

For gearbox 30 in FIG. 1, each of the three planetary gear sets provide one equation relating the speeds of the six shafts. When the gearbox is engaged in a particular gear ratio (not shifting), the two engaged clutches each provide one equation relating the speeds of the shafts. With six shafts and five equations, we must have one measured speed in order to be able to calculate all of the speeds. This additional speed could be provided by turbine speed sensor 86 or by output speed sensor 88. For example when third gear is engaged (clutch 74 and brake 78 engaged), the speeds of the six shafts can be determined by simultaneously solving the six equations:

$$N_{42}\omega_{42} + N_{46}\omega_{46,54} = (N_{42} + N_{46})\omega_{14,44,66} \text{ (from gear set 40)}$$

$$N_{52}\omega_{22,52} + N_{56}\omega_{56,64} = (N_{52} + N_{56})\omega_{46,54} \text{ (from gear set 50)}$$

$$N_{62}\omega_{62} + N_{66}\omega_{14,44,66} = (N_{62} + N_{66})\omega_{56,64} \text{ (from gear set 60)}$$

$$\omega_{22,52} = \omega_{62} \text{ (from clutch 74 being engaged)}$$

$$\omega_{42} = 0 \text{ (from brake 78 being engaged)}$$

$$\omega_{14,44,66} = \text{measured}$$

The second speed sensor may be used to confirm that third gear is in fact engaged. Each speed is proportional to the measured speed. The equations can be solved in advance to find the coefficient of proportionality for each shaft for each gear ratio.

For gearbox 30, there are 21 element torques to be calculated, three for each planetary gear set, two for each clutch, plus the input torque and the output torque. Each of the three planetary gear sets provides two torque equations. Each of the five shift elements provides one torque equation. Each of the six shafts provides one torque equation. (By convention, output torque is defined as the torque exerted by the gearbox on the output, whereas other torques are defined as the torque exerted by the component on the shaft. Therefore, output torque appears on the opposite side of the shaft torque equation from component torques.) Each shaft equation requires the shaft acceleration which is determined by numerically differentiating the shaft speed. Collectively, this provides 17 torque equations. When the gearbox is engaged in a particular gear ratio, the three disengaged clutches each provide an additional torque equation. Therefore, one sensed torque is required, which is provided by torque sensor 90. For example when third gear is engaged, the torques can be determined by simultaneously solving the 21 equations:

$$N_{46}\tau_{42} = N_{42}\tau_{46}$$

$$\tau_{42} + \tau_{44} + \tau_{46} = 0$$

$$N_{56}\tau_{52} = N_{52}\tau_{56}$$

$$\tau_{52} + \tau_{54} + \tau_{56} = 0$$

$$N_{66}\tau_{62} = N_{62}\tau_{66}$$

$$\tau_{62} + \tau_{64} + \tau_{66} = 0$$

$$\tau_{hub\ 72} + \tau_{shell\ 72} = 0$$

$$\tau_{hub\ 74} + \tau_{shell\ 74} = 0$$

$$\tau_{hub\ 76} + \tau_{shell\ 76} = 0$$

$$\tau_{hub\ 78} + \tau_{shell\ 78} = 0$$

$$\tau_{hub\ 80} + \tau_{shell\ 80} = 0$$

$$\tau_{input} + \tau_{22} + \tau_{shell\ 72} + \tau_{hub\ 74} = J_{22,52} a_{22,52}$$

$$\tau_{42} + \tau_{hub\ 78} = J_{42} a_{42}$$

$$\tau_{44} + \tau_{66} = \tau_{output} + J_{14,44,66} a_{14,44,66}$$

$$\tau_{46} + \tau_{54} = J_{46,54} a_{46,54}$$

$$\tau_{56} + \tau_{64} + \tau_{hub\ 72} + \tau_{hub\ 80} = J_{56,64} a_{56,64}$$

$$\tau_{62} + \tau_{shell\ 74} + \tau_{hub\ 76} = J_{62} a_{62}$$

$$\tau_{hub\ 72} = 0 \text{ (from clutch 72 being disengaged)}$$

$$\tau_{hub\ 76} = 0 \text{ (from brake 76 being disengaged)}$$

$$\tau_{hub\ 80} = 0 \text{ (from brake 80 being disengaged)}$$

$$\tau_{output} = \text{measured}$$

These equations can be manipulated such that each torque is expressed as a sum of two terms, one term proportional to the measured torque and the other proportional to the measured acceleration. The coefficients of proportionality can be determined in advance for each gear ratio. The hub and shell torque of the applied shift elements, 74 and 78 in this example, indicate a lower limit on the respective shift element torque capacity. However, the actual torque capacity cannot be determined using this model.

The above model disregards parasitic losses. However, the model can be modified to account for some types of parasitic losses. For example, a disengaged shift element does not necessarily have zero torque capacity. This type of parasitic drag can be accounted for in the model by calculating the torque capacity of disengaged clutches as a function of the speeds of the hub and the shell, or as a function of the speed difference. Windage losses can be accounted for by adding a windage term in each shaft torque equation where the windage term is a function of the shaft speed. Mesh efficiency can be accounted for by slightly increasing or decreasing the tooth counts in the equation that relates the sun gear torque to the ring torque. Whether the tooth count is increased or decreased depends on the relative speeds and the direction of the torque. When losses are modeled this way, the individual component torques (e.g., clutch torques) can still be computed based on a single measured speed and a single measured torque, although it may not be possible to pre-simplify the equations.

An alternative approach to modeling parasitic losses is to model the aggregate losses of the gearbox. The aggregate power loss of the gearbox may be tabulated as a function of the measured speed and measured torque and possible other factors such as fluid temperature. This table may be populated empirically using a dynamometer, using detailed component models, or some combination of the two. One disadvantage of using an aggregate loss model is that it is not as amenable to calculating individual component torques as a detailed component by component loss model.

During a shift between ratios, the calculations of component torque must be modified. A typical upshift includes three phases: a preparatory phase, a torque transfer phase, and an inertia phase. During the preparatory phase, pressure is commanded to the on-coming shift element in order to stroke the piston so that it is ready for engagement. Also, the torque capacity of the off-going shift element may be reduced from a holding capacity well in excess of the transmitted torque to a value close to the actual transmitted torque. During the torque transfer phase, the torque capacity of the off-going shift element is gradually reduced and the torque capacity of the on-coming shift element is gradually increased. During this phase, there is little or no slip across the off-going shift element but considerable slip across the on-coming shift element. When the off-going shift element torque capacity reaches zero, the power flow path associated with the upshifted gear is established. Therefore, the torque ratio is equal to the upshifted torque ratio. However, the speed ratio is still equal or nearly equal to the original speed ratio. When the off-going shift element is completely released, the torque transfer phase ends and the inertia phase begins. During the inertia phase, the torque capacity of the on-coming shift element is controlled to eliminate the slip across the on-coming shift element and bring the speed ratio to the upshifted speed ratio in a controlled manner.

A downshift also includes an inertia phase and a torque transfer phase, although they occur in the opposite order. During the inertia phase, the torque capacity of the off-going shift element is controlled to bring the speed ratio to the downshifted speed ratio in a controlled manner, which involves a progressively increasing slip across the off-going shift element. The on-coming shift element may be prepared for engagement by commanding pressure in order to stroke the piston. During the inertia phase, the torque capacity of the on-coming shift element is gradually increased while the torque capacity of the off-going element is reduced to zero.

During the shift, neither the on-coming nor the off-going shift element can be assumed to have zero slip. Although it may be intended for the off-going shift element to have zero slip during the torque phase of an upshift and for the on-coming shift element to have zero slip during the torque phase of a downshift, the controller cannot assume this to be the case. Therefore, one of the component speed equations that is used when the transmission is in a fixed gear is not available during the shift. Consequently, both speed sensors 86 and 88 contribute speed equations. In some shifts, more than one clutch is released and more than one clutch is engaged. In such shifts, more than two shafts speeds must be determined with sensors.

Similarly, during the shift, neither the on-coming nor the off-going shift element can be assumed to have zero torque capacity. Although it may be intended for the on-coming shift element to have zero torque capacity during the preparatory phase of an upshift and during the inertia phase of a downshift, the controller cannot assume this to be the case. Sometimes, the pressure intended to merely stroke the piston actually causes a torque capacity increase. Therefore, one of the component torque equations that is used when the transmission is in a fixed gear is not available during the shift. If the transmission is not equipped with a second torque sensor, then a model may be used to estimate the input torque to provide the additional component torque equation.

$$\tau_{input} = \tau_{turbine} + \tau_{hub\ 28}$$

When torque converter lock-up clutch 28 is disengaged, the torque at the hub of lock-up clutch 28 is zero. Therefore, a model of the torque converter can provide the additional torque estimate needed during shifting. For a particular torque converter geometry (diameter, blade angles, etc), the hydro-dynamic torques exerted on the torque converter elements are functions of the turbine speed and the impeller speed. Environmental factors, such as fluid temperature, may also impact the relationship to some degree. A suitable torque converter model is described in U.S. Patent Publication 2013/0345022 which is hereby incorporated by reference herein. Specifically, $$\tau_{impeller} = f1(\omega_{impeller}/\omega_{turbine}, \text{temp}, \ldots)\omega_{impeller}^2$$

$$\tau_{turbine} = f2(\omega_{impeller}/\omega_{turbine}, \text{temp}, \ldots)\omega_{impeller}^2$$

$$\tau_{turbine} + \tau_{impeller} + \tau_{stator} = 0$$

The functions f1 and f2 can be determined experimentally and stored by the controller as tables. The turbine speed is directly measured using sensor 86. The impeller speed is equal to the engine crankshaft speed and can be obtained using a third speed sensor or by communication with an engine controller.

When lock-up clutch 28 is engaged, on the other hand, a model of the engine torque can provide the additional torque estimate needed during shifting. The transmission controller may obtain the current engine torque estimate by requesting it from the engine controller which maintains an engine torque model. Specifically, $$\tau_{engine} + \tau_{impeller} + \tau_{shell\ 28} = J_{12}a_{12}$$

When lock-up clutch 28 is fully engaged, the impeller torque is zero. When the lock-up clutch is slipping, the hydro-dynamic model above may be used to estimate the impeller torque.

During the shift, accurate control of torque capacity is important in order to achieve a smooth shift. For example, during the torque transfer phase, the increase in torque capacity of the on-coming shift element must be carefully coordinated with the decrease in torque capacity of the off-going shift element. If the torque capacity of the on-coming shift element is ramped up too slowly, relative to the input torque and the rate of decrease of off-going shift element torque capacity, then an engine flare occurs. If, on the other hand, the on-coming shift element torque is ramped up too quickly, then a tie-up condition occurs. Both result in an excessive decrease in output torque.

Open loop control of shifts is aided by having a model for each shift element. The torque capacity of each clutch is adjusted by adjusting an electrical current to a solenoid in the valve body. A valve in the valve body responds by adjusting the pressure in a fluid circuit in proportion to the force generated by the solenoid. The fluid is routed to a clutch apply chamber where it pushes a piston to compress a clutch pack with interleaved friction plates and separator plates. A return spring forces the piston back when the pressure is relieved. In an exemplary steady state model of a hydraulically actuated friction clutch or brake, the torque capacity is a function of the electrical current supplied. This function generally has two segments. In a first segment, from zero current up to the current required to overcome the force of the return spring, the torque capacity is zero. Beyond the current required to overcome the return spring, the torque capacity increases linearly with respect to the current. In an alternative model, the fluid pressure is a function of the electrical current and the torque capacity is a function of the fluid pressure. This alternative model may be useful if a pressure sensor is available to provide a pressure feedback signal. In some models, other factors such as temperature may be considered. A dynamic model of the hydraulically actuated shift element may account for the time delay while the piston moves from the released position to the stroked position.

At each time step, the controller determines a desired torque capacity for each shift element and then determines what electric current to command to the corresponding solenoid using the shift element model. This open loop control method, however, is subject to inaccuracy due to various noise factors. When a torque capacity estimate based on a measurement is available, the inaccuracies can be reduced using closed loop terms. When a clutch is slipping, such as the on-coming element in an upshift torque phase or the off-going element in a downshift torque phase, the gearbox model described above provides such an estimate. Furthermore, the estimated torque capacity can be used to adaptively revise the shift element model. Consequently, control is improved even when the shift element is not slipping, such as the off-going element in an upshift or the on-coming element in a downshift.

When the transmission is in a fixed gear ratio, there are multiple models which predict gearbox input torque. This provides an opportunity to adaptively refine one or both models. One estimate is produced by the gearbox model in combination with a torque sensor reading and a speed sensor reading. This model may include component parasitic loss models or an aggregate parasitic loss model. When lock-up clutch 28 is fully engaged, a second gearbox input torque estimate is based on an engine model. If the estimates differ, the engine model may be modified to bring that estimate closer to the gearbox based estimate. Alternatively, or additionally, the aggregate gearbox loss model may be modified to bring the gearbox based estimate closer to the engine model based estimate. Similarly, when lock-up clutch 28 is disengaged, a second gearbox input torque estimate is based on a torque converter model. If the estimates differ, the torque converter model, the aggregate gearbox loss model, or both may be modified to bring the estimates closer together. Also, when lock-up clutch 28 is disengaged, both the engine model and the torque converter model estimate impeller torque. If these two estimates differ, one or both models may be modified to bring the estimates closer together.

Several of the models described above can be represented in controller 84 as one or more lookup tables. A lookup table stores predicted values of a model output variable for various combinations of values of one or more model input variables. When there is only one input variable, the lookup table is referred to as one dimensional. For example, a one dimensional lookup table may be used to represent the clutch transfer function model by storing values of clutch torque capacity at various commanded pressures. When the output variable is dependent upon multiple input variables, higher dimensional lookup tables are used. For example, the aggregate gearbox loss model for 3rd gear may be represented as a three dimensional lookup table based on gearbox input torque, gearbox input speed, and temperature. If the model includes multiple output variables, it may be represented by multiple lookup tables. For example, the torque converter model may have one lookup table for impeller torque and another lookup table for turbine torque.

To find a value for a model output variable based on particular values of the model input variables, the controller finds the stored points that are closest to the particular values and then interpolates. For example, to find the predicted gearbox losses at 1200 rpm input speed and 75 Nm input torque, the controller may interpolate between the stored loss values at (1000 rpm, 70 Nm), (1500 rpm, 70 Nm), (1000 rpm, 80 Nm), and (1500 rpm, 80 Nm). To find an input variable corresponding to a desired output variable, reverse interpolation is used. For example, to find the open loop pressure command for a desired clutch torque capacity of 95 Nm, the controller may interpolate between a stored point that yields 92 Nm and a stored point that yields 96 Nm. This reverse interpolation yields a unique solution only when the underlying function is monotonic. Alternatively, the model may be re-formulated such that torque capacity is an input variable and commanded pressure is an output variable.

Several methods are known for adaptively updating a model represented as a lookup function. These include both stochastic adaptation methods and periodic adaptation methods. Stochastic adaptation methods update the values in the lookup table in response to individual observed results. One such method is described in European Patent Application EP 1 712 767 A1, which is incorporated by reference herein. When the observed result differs from the value estimated by the lookup table, the stored values for nearby values of the model input variables are modified such that a new prediction for the same model input values is closer to the observed result. In the example above, stored gearbox loss estimates at (1000 rpm, 70 Nm), (1500 rpm, 70 Nm), (1000 rpm, 80 Nm), and (1500 rpm, 80 Nm) were used to predict gearbox losses at 1200 rpm input speed and 75 Nm input torque. If the interpolation yields an estimate of 1.5 Nm of loss and the observed loss is 2.5 Nm, those four stored values might each be increased by 0.2 Nm such that a new estimate at the same operating point would be 1.7 Nm. For stability, the adaptation is not allowed to change the stored values by too much at once. The adaptation may be restricted in various ways. For example, adaptation may only be allowed when the operating point is sufficiently close to one of the stored values. In this example, adaptation may not be performed for the observation at 1200 rpm and 75 Nm but may be allowed for operating points within 100 rpm at 2 Nm of one of the stored values. Also, there may be pre-defined bounds outside which adaptation is not performed. For example, in the gearbox loss model, stored values may not be permitted to become negative since actual losses would never be negative. In a periodic adaptation method, multiple observations are stored and then a curve fitting process is performed to calculate new values for model parameters. As with stochastic adaptation methods, there may be restrictions on the rate of adaptation and there may be boundaries beyond which adaptation is not permitted.

During operation of a transmission, there are several operating conditions in which more than one model is available to predict a particular parameter. In such a circumstance, the controller may select one of the estimates as the trusted value. This selection may be based on a priori information about which model tends to be more accurate. The selection may also be based on other criteria such as when the inputs to one model are relatively constant and the inputs to the other model are changing rapidly making the former model more trustworthy. The controller may utilize the trusted value to adapt the less trusted model, making the less trusted model more trustworthy in other circumstances. Alternatively, the controller may select a value that is a weighted average of the multiple estimates, with weighting factors based on the degree of trust of each model. In that case, both models may be subject to adaptation to bring the estimates closer to the selected value. This approach is most useful if each model is also adapted in other circumstances based on independent models. If one model is correct and the other model is inaccurate, the correct model will be re-adapted toward its original prediction in those other circumstances.

Figure 2:
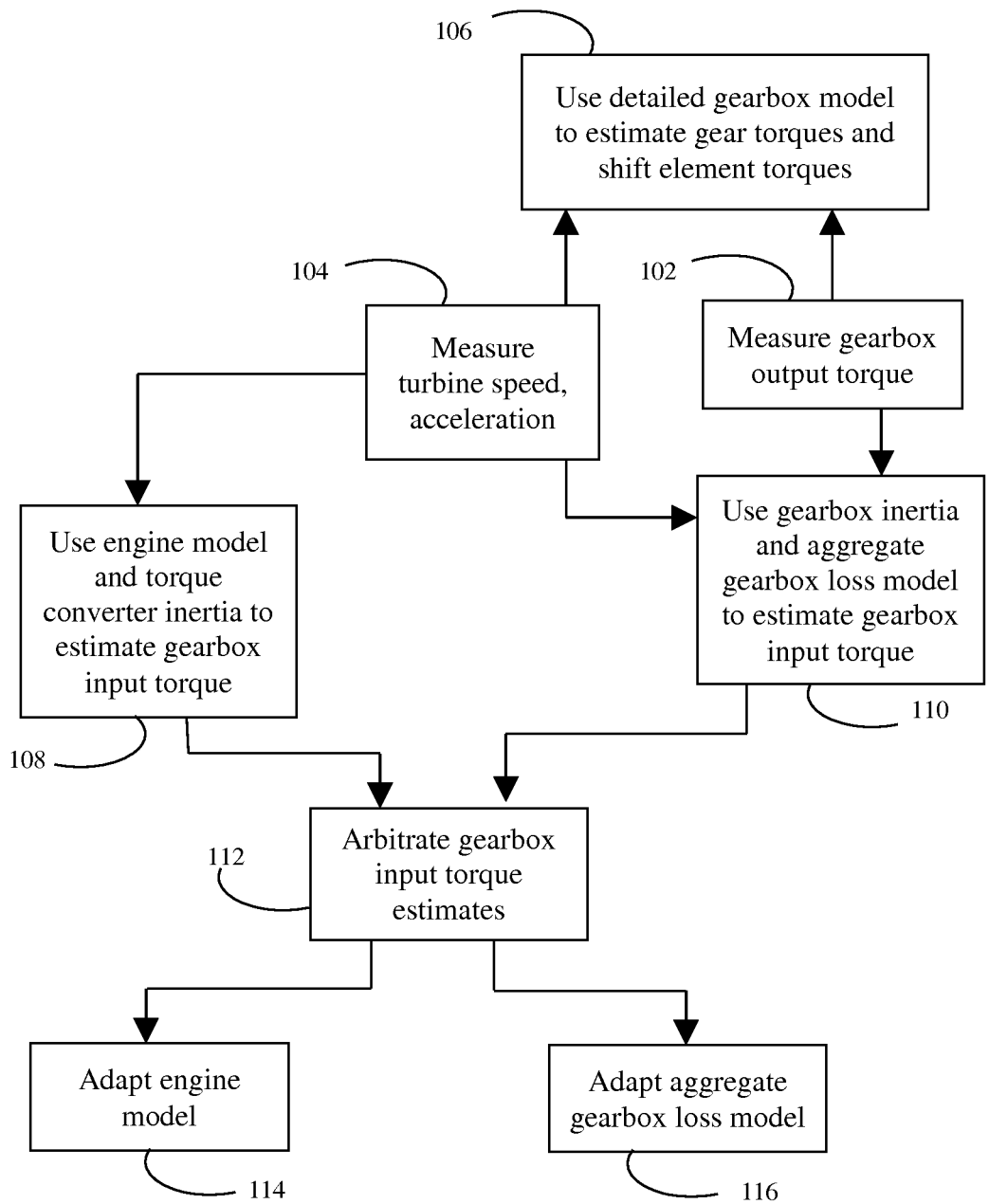
FIG. 2 is a flow chart for operating a transmission in a fixed gear ratio with the torque converter lockup clutch fully engaged.

FIG. 2 illustrates a process for operating a transmission, such as the transmission of FIG. 1, when the torque converter lockup clutch 28 is fully engaged and the transmission is to remain in the current gear ratio. This process is repeated at regular intervals while the transmission remains in this condition. The gearbox output torque is measured at 102 using torque sensor 90, for example. The turbine speed is measured at 104 using speed sensor 86, for example. The acceleration rate of the turbine may be determined by numerically differentiating the turbine speed signal or may be measured by a separate sensor. Since the turbine speed and the engine speed are equal in this operating condition, an engine speed sensor or impeller speed sensor could be used instead of a turbine speed sensor. At 106, a detailed gearbox model is used to estimate the torques of each transmission component of interest, such as gears and shift elements. These torques are proportional to the gearbox output torque measured at 102 corrected for parasitic losses, which may be based on the speed measured at 104, and inertia effects based on the acceleration measured at 104. In this condition, the gearbox input torque is equal to the engine torque after accounting for any torque used to accelerate the torque converter inertia. Therefore, the gearbox input torque may be computed at 108 based on an engine model and the acceleration measured at 104. The gearbox input torque may also be computed at 110 using a gearbox aggregate loss model, the gearbox output torque measured at 102, and correcting for inertia based on the acceleration measured at 104. Since two estimates of gearbox input torque are available, the controller arbitrates between these estimates at 112. For example, the arbitration routine may use a weighted average of the two estimates with the weighting factors based on prior assessments of the trustworthiness of each model. If either model produces a result that is considered unreasonable, the arbitration routine may disregard that estimate and use the other estimate. At 114 and 116, the controller uses the resulting estimate to adapt the engine model and aggregate loss model respectively. In this condition, the controller commands a high pressure to each engaged shift element for the current gear ratio to ensure that the clutches remain fully engaged.

Figure 3:
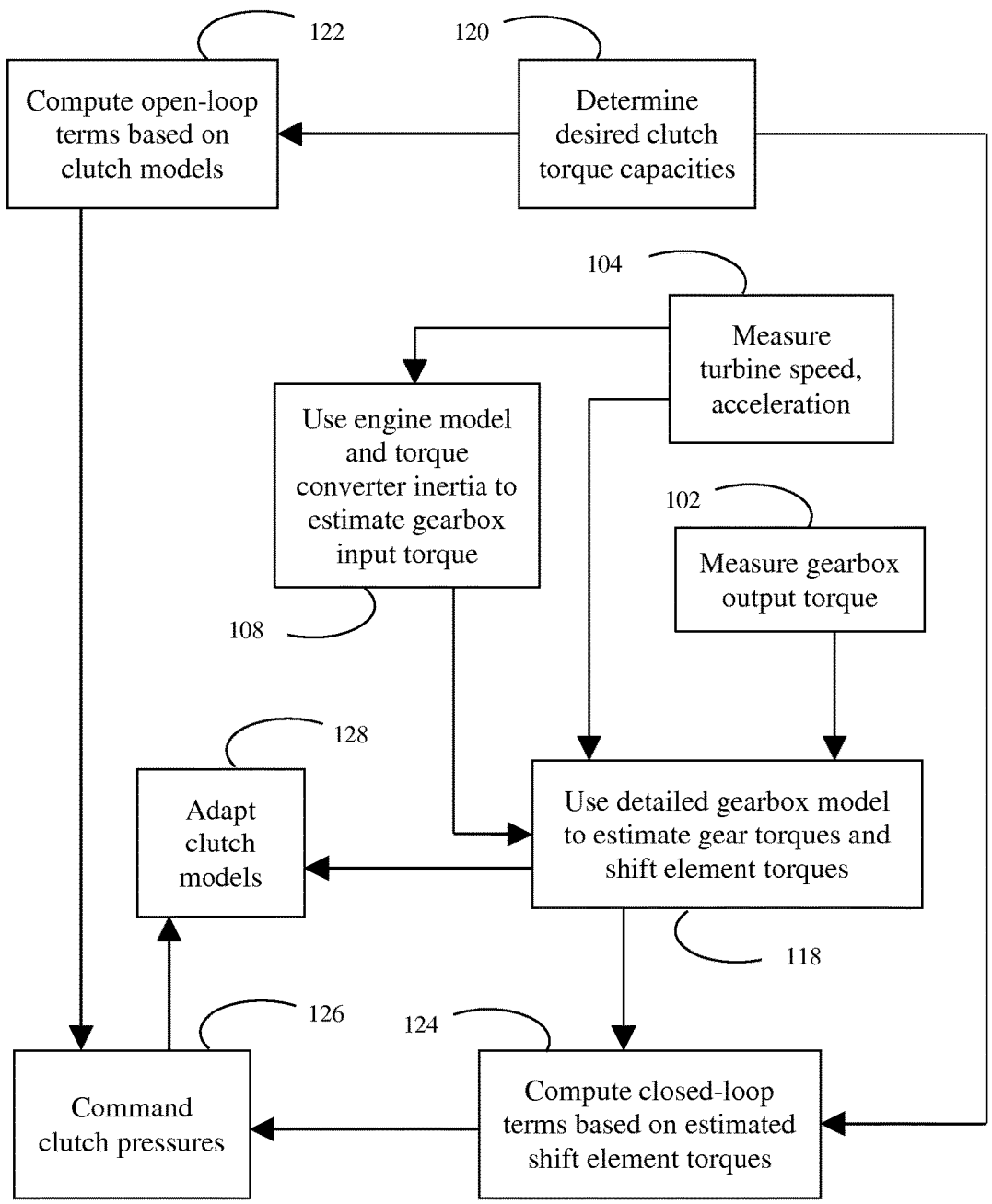
FIG. 3 is a flow chart for shifting a transmission with the torque converter lockup clutch fully engaged.

FIG. 3 illustrates a process for operating a transmission during a shift when the torque converter lockup clutch is fully engaged. This process is repeated at regular intervals during the shift. Steps that are common with FIG. 2 use the same reference number. At 118, the detailed gearbox model is used to estimate the torques of each transmission component of interest, such as gears and shift elements. During the shift, the detailed gearbox model requires two input torque values, so both the measured torque from 102 and the estimated gearbox input torque from 108 are utilized. The desired clutch torque capacities, as required to generate the desired shift feel, are computed at 120. At 122, a clutch model for each clutch is used to calculate the pressure required to produce the desired torque, which is used as an open loop term for clutch pressure control. At 124, the difference between the desired clutch torque capacity and the corresponding estimates from 118 is used to compute closed loop terms. At 126, the control commands a pressure equal to the sum of the open loop term and the closed loop terms. At 128, the commanded pressure from 126 and the estimated shift element torque from 118 may be used to adapt the clutch models, such that future shifts are improved due to reduced reliance on closed loop feedback.

Figure 4:
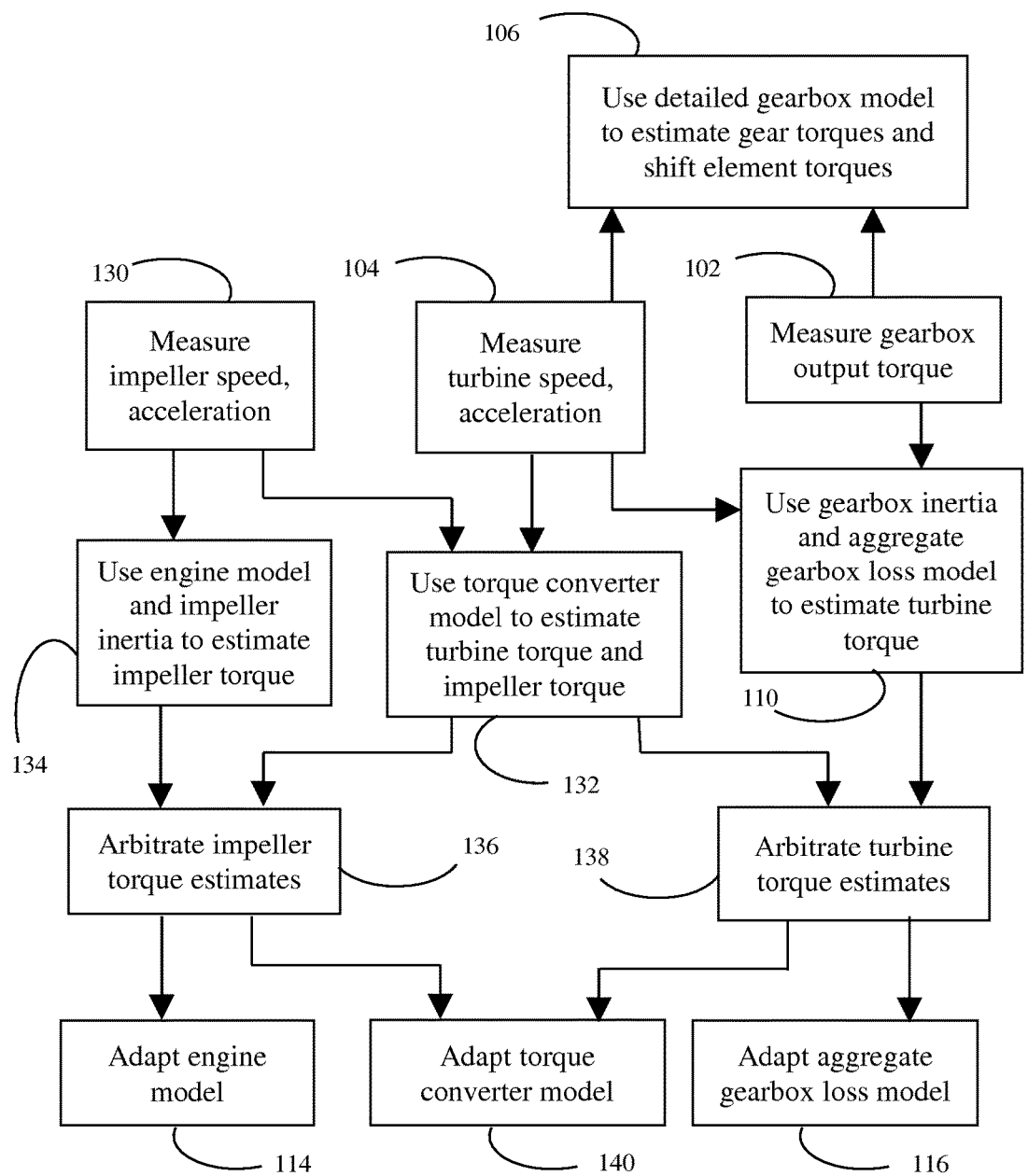
FIG. 4 is a flow chart for operating a transmission in a fixed gear ratio with the torque converter lockup clutch fully disengaged.
Figure 5:
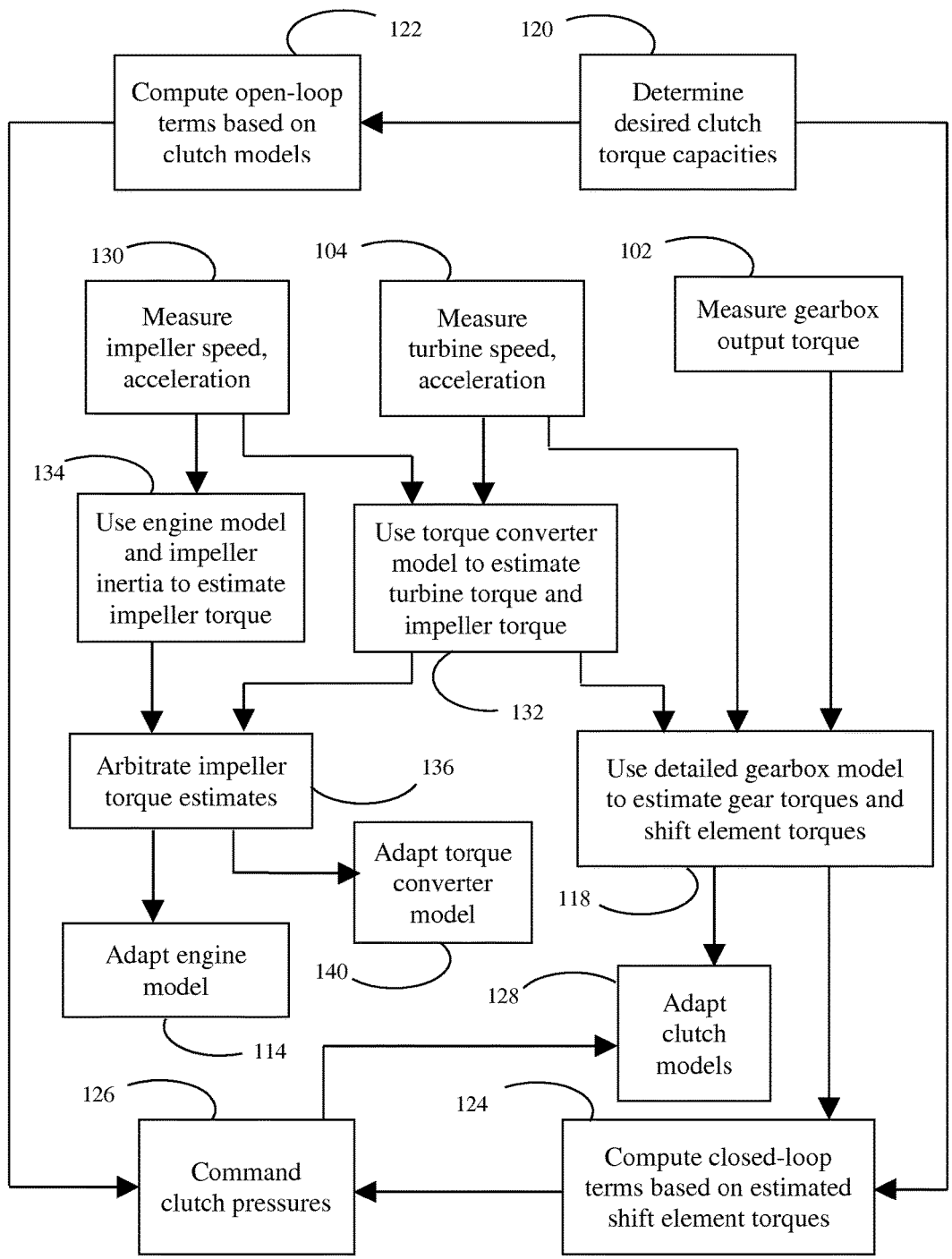
FIG. 5 is a flow chart for shifting a transmission with the torque converter lockup clutch fully disengaged.

FIG. 4 illustrates a process for operating a transmission when the torque converter lockup clutch is fully disengaged and the transmission is to remain in the current gear ratio. This process is repeated at regular intervals while the transmission remains in this condition. As in the process of FIG. 2, a turbine torque estimate is generated at 110 based on measured gearbox output torque, turbine speed, and turbine acceleration, using an aggregate gearbox loss model. Additionally, impeller speed and acceleration are measured at 130. At 132, a torque converter model is used with the measured impeller speed and measured turbine speed to estimate the impeller torque and the turbine torque. At 134, the engine model is used to produce a second estimate of impeller torque. Since there are two estimates of impeller torque and two estimates of turbine torque, arbitration is performed at 136 and 138 to select values. The selected values may be used to adapt the engine model, torque converter model, and aggregate gearbox loss model at 114, 140, and 116 respectively. FIG. 5 illustrates a process for operating the transmission during a shift when the torque converter lockup clutch is fully disengaged. As in the method of FIG. 3, both the turbine torque and the gearbox output torque are used at 118 with the detailed gearbox model to estimate the shift element torques. These shift element torques estimates may be used at 128 to adapt the corresponding clutch models. Since only one turbine torque estimate is produced, only the impeller torque aspect of the torque converter model is adapted at 140.

Figure 6:
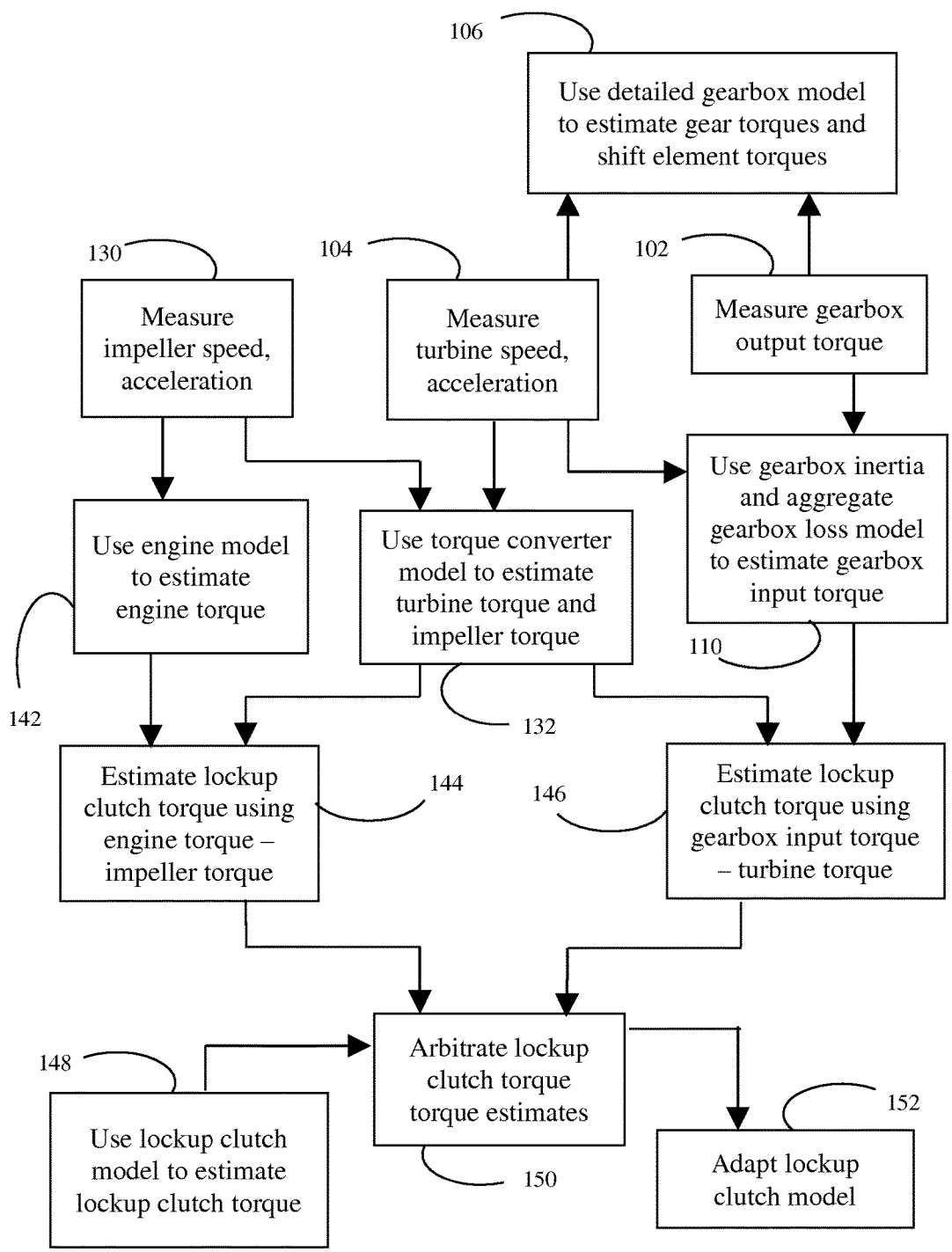
FIG. 6 is a flow chart for operating a transmission in a fixed gear ratio with the torque converter lockup clutch partially engaged.
Figure 7:
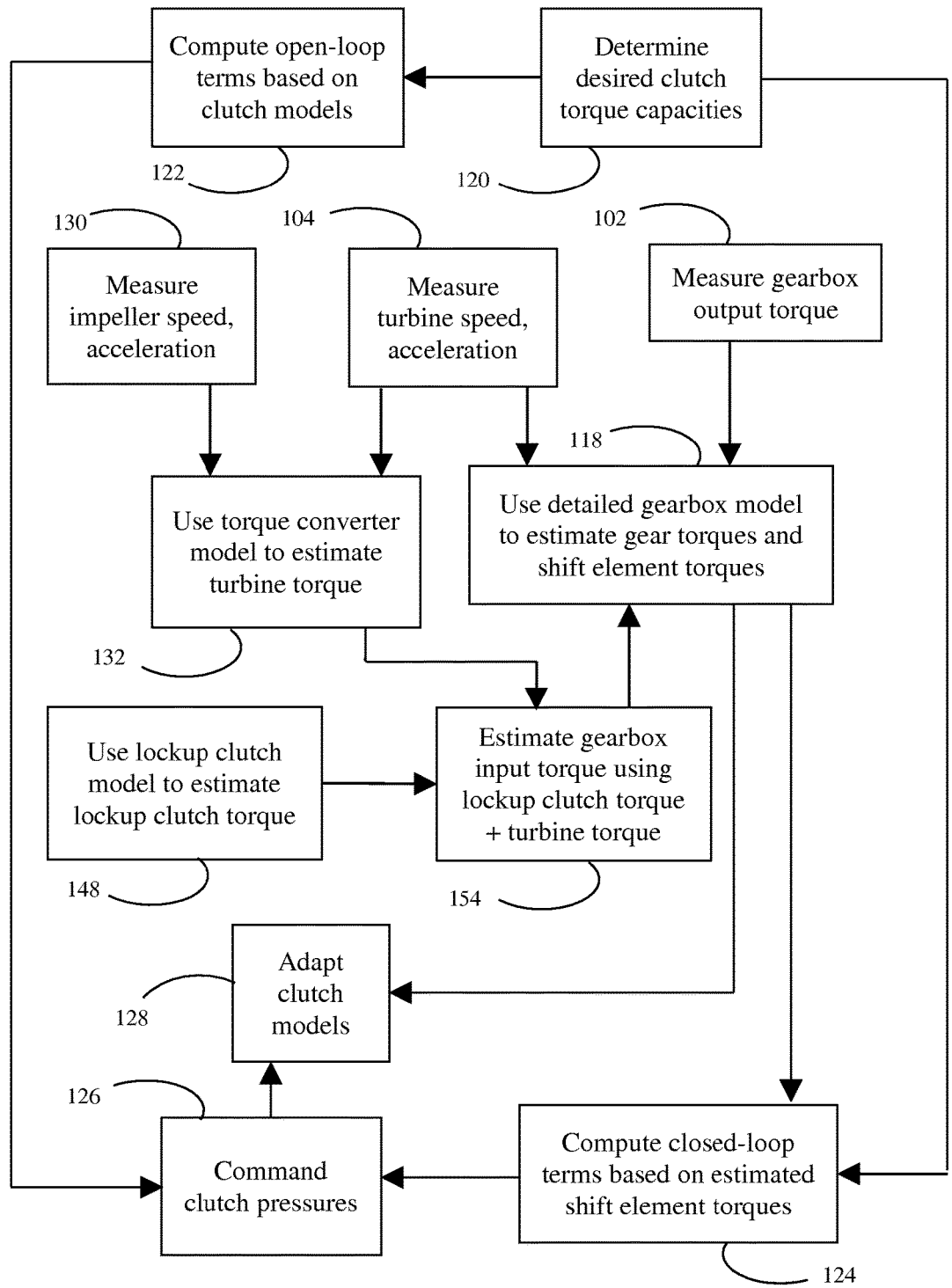
FIG. 7 is a flow chart for shifting a transmission with the torque converter lockup clutch partially engaged.

FIG. 6 illustrates a process for operating a transmission when the torque converter lockup clutch is partially engaged and the transmission is to remain in the current gear ratio. This process is repeated at regular intervals while the transmission remains in this condition. In this condition, the gearbox input torque is the sum of the turbine torque and the lockup clutch torque. Similarly, the engine torque is the sum of the lockup clutch torque and the impeller torque. The gearbox input torque is estimated at 110 based on the measured gearbox output torque and the aggregate loss model. The turbine torque and impeller torque are estimated at estimated at 132 based on measured impeller and turbine speeds. The engine torque is estimated at 142 based on the measured impeller speed, which is equal to the engine speed. The lockup clutch torque is estimated in three ways. At 144, the lockup clutch torque is estimated by subtracting the impeller torque estimate from the engine torque estimate. At 146, the lockup clutch torque is estimated by subtracting the turbine torque estimate from the gearbox input torque estimate. At 148, the lockup clutch torque is estimated using a lockup clutch model. The arbitrated lockup clutch torque estimate produced at 146 is then used to adapt the lockup clutch model at 148. FIG. 7 illustrates a process for shifting the transmission while the lockup clutch is slipping. At 154, the gearbox input torque is estimated by adding the estimated clutch torque produced by the lockup clutch model at 148 to the turbine torque estimate produced at 132.

Figure 8:
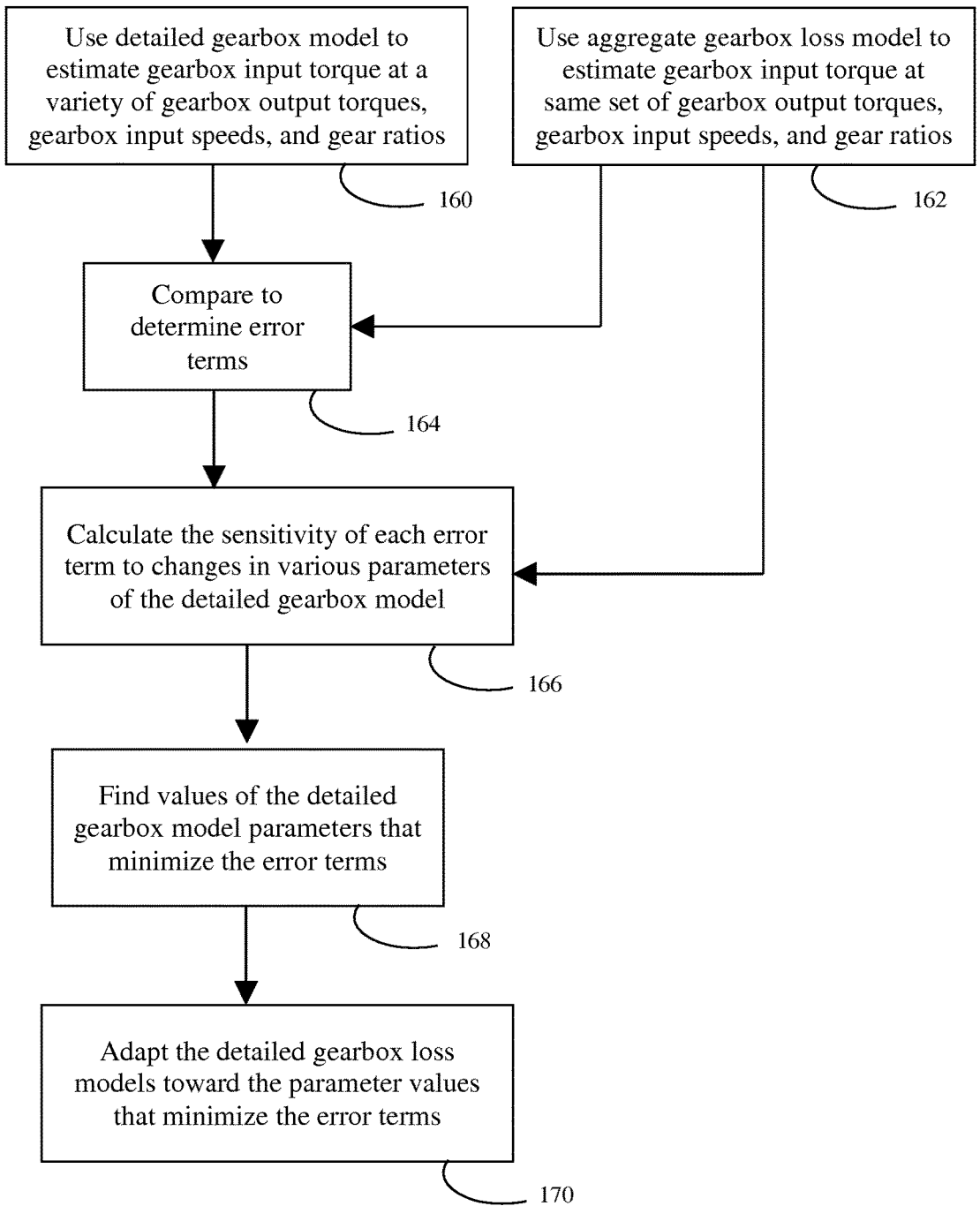
FIG. 8 is a flow chart for adapting a detailed gearbox model based on an aggregate gearbox loss model.

FIG. 8 illustrates a process for adapting the detailed gearbox model. This process is executed much less frequently than the processes of FIGS. 2-7. This process propagates the gradual adaptation of the aggregate gearbox loss model to the detailed gearbox model. Stochastic adaptation may be unsuitable for this because many parameters in the detailed gearbox model may contribute, to varying degrees, to the losses at a particular operating point. A stochastic adaptation algorithm may be unable to determine which parameter to adapt. However, since the relative contribution differs at different operating points, it may be possible to identify which parameter to adjust after observing an appropriate variety of operating points. At 160, the detailed gearbox model is used to estimate the gearbox input torque corresponding to a variety of gearbox output torques, gearbox input speeds, and gear ratios. The collection of output torques, input speeds, and gear ratios may be predetermined or may be derived from the operating points observed since the previous execution of the process. At 162, the aggregate gearbox loss model is used to estimate the gearbox input torque at the same collection of operating points. The values from the two models are compared at 164 to calculate a set of error terms. The number of error terms is equal to the number of operating points considered. At 166, the process computes the sensitivity of each error term to changes in various parameters of the detailed gearbox model. These parameters may be, for example, particular values in lookup tables. Computing the sensitivities may involve repeating the calculations from 160 and 164 with each parameter slightly perturbed from its nominal value. The number of parameters should be equal to or larger than the number of operating points. At 168, revised parameter values that minimize the error terms are computed. This may involve, for example, a least squares curve fit. Finally, at 170, the parameter values are adapted toward the values calculated at 168. To avoid instability, the process may adjust the parameter values to an intermediate value between the original value and the value computed at 168.

The processes of FIGS. 2-8 provide the ability to compute torque estimates for gears and shift elements within a gearbox based on an output torque sensor, impeller and turbine speed sensors, and a variety of models. The processes also provide the ability to adapt the models such that they accurately represent the current behavior of the system despite part to part variation and component changes over time. The above are but examples of estimating torques for gears and shift elements within a gearbox.

In a torque based clutch control scheme, such as those described above, the desired clutch torque is converted to a pressure command using a feed-forward controller which transforms torque into pressure and optionally compensates for clutch dynamics. In this system, the clutch torque is independently estimated and compared against the expected clutch torque to dynamically adapt the clutch-torque-to-pressure transfer function. To achieve the best shifting performance and consistency, the control system can include both feed-forward and feedback compensators. Based on a desired clutch torque, a nominal feed-forward clutch pressure could be commanded based on one of the models which transforms torque into pressure. To provide robustness, this nominal pressure would be adjusted to compensate for any differences between the desired clutch torque and the achieved clutch torque as estimated by an independent model. In addition to adjusting the clutch torque command, the estimated clutch torque is also compared against the expected clutch torque to dynamically adapt the clutch-torque-to-pressure transfer function.

As explained above, the clutch torque is typically not directly measured. However, it can be estimated with a combination of physical models, sensor measurements and state estimates. A challenge in estimating the clutch torques is that the accuracy of the clutch torque estimates depends on the state of the system. For a given clutch, the estimated clutch torque may be accurate within +/−50 Nm for one shift (e.g., from $2^{nd}$ to $3^{rd}$ gear) and may be accurate within +/−5 Nm for another shift (e.g., from $5^{th}$ gear to $3^{rd}$ gear). Moreover, the accuracy of the estimates used to calculate clutch torques can also vary (age, temperature, etc.) and this variability is transferred to the clutch torque estimates.

Figure 9:
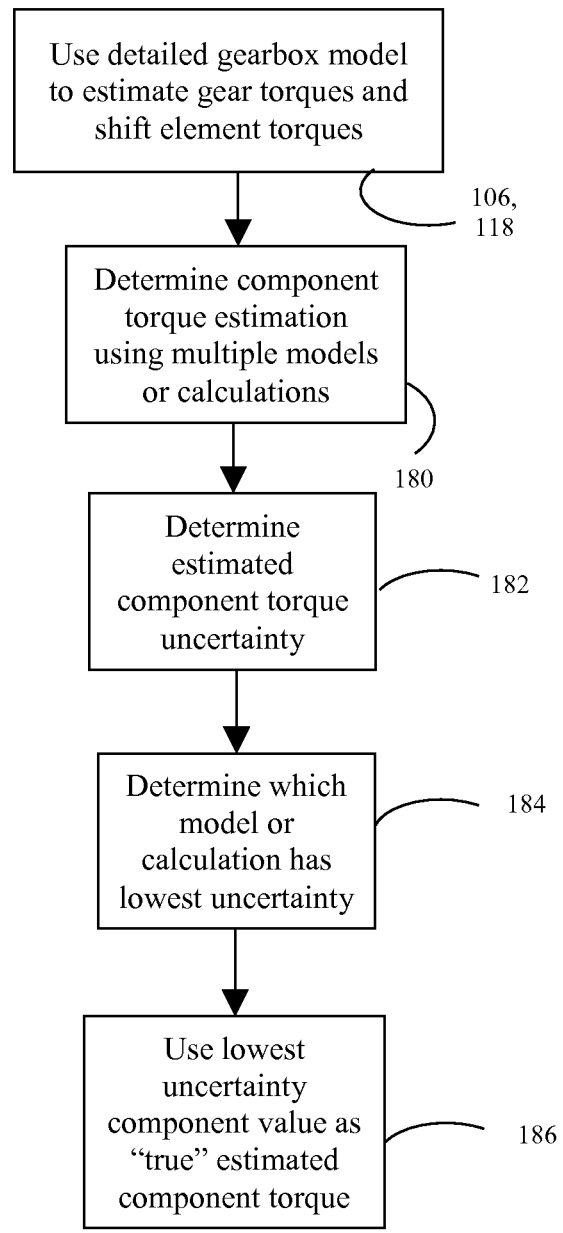
FIG. 9 is a flow chart for selecting the method of estimating component torques which produce the lowest uncertainty of torque prediction.
Figure 10:
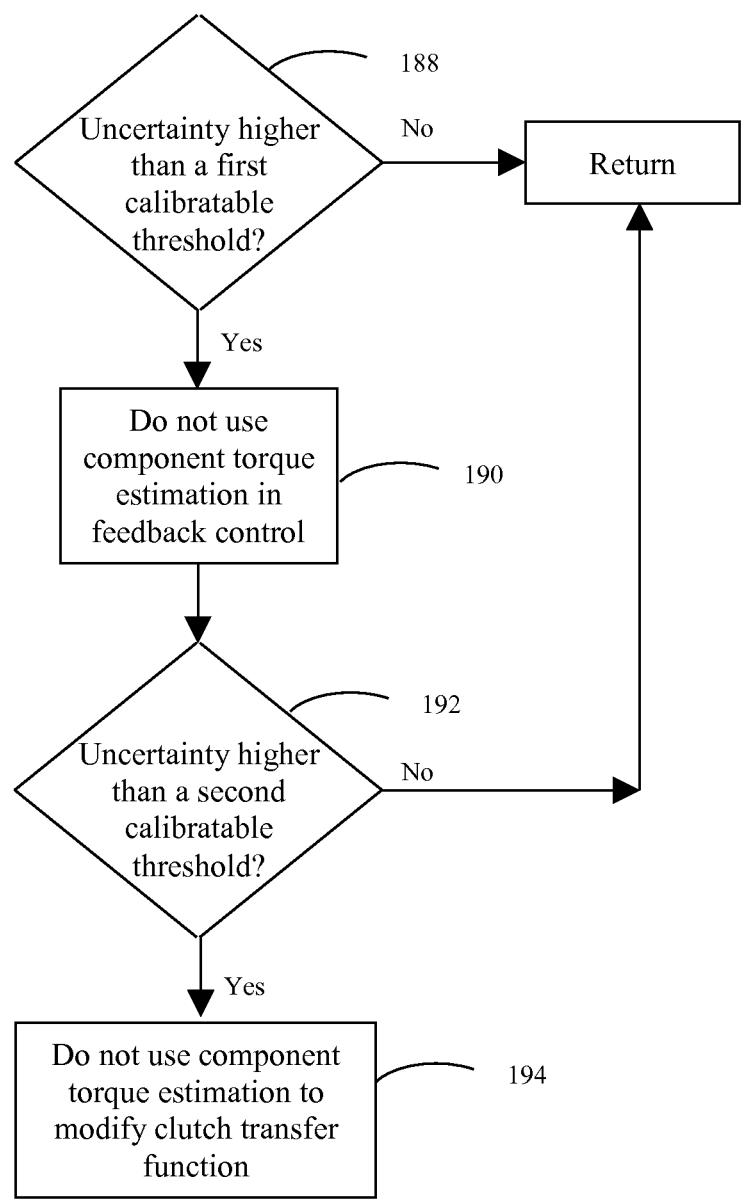
FIG. 10 is a flow chart illustrating one embodiment of estimating and utilizing clutch torque uncertainties.
Figure 11:
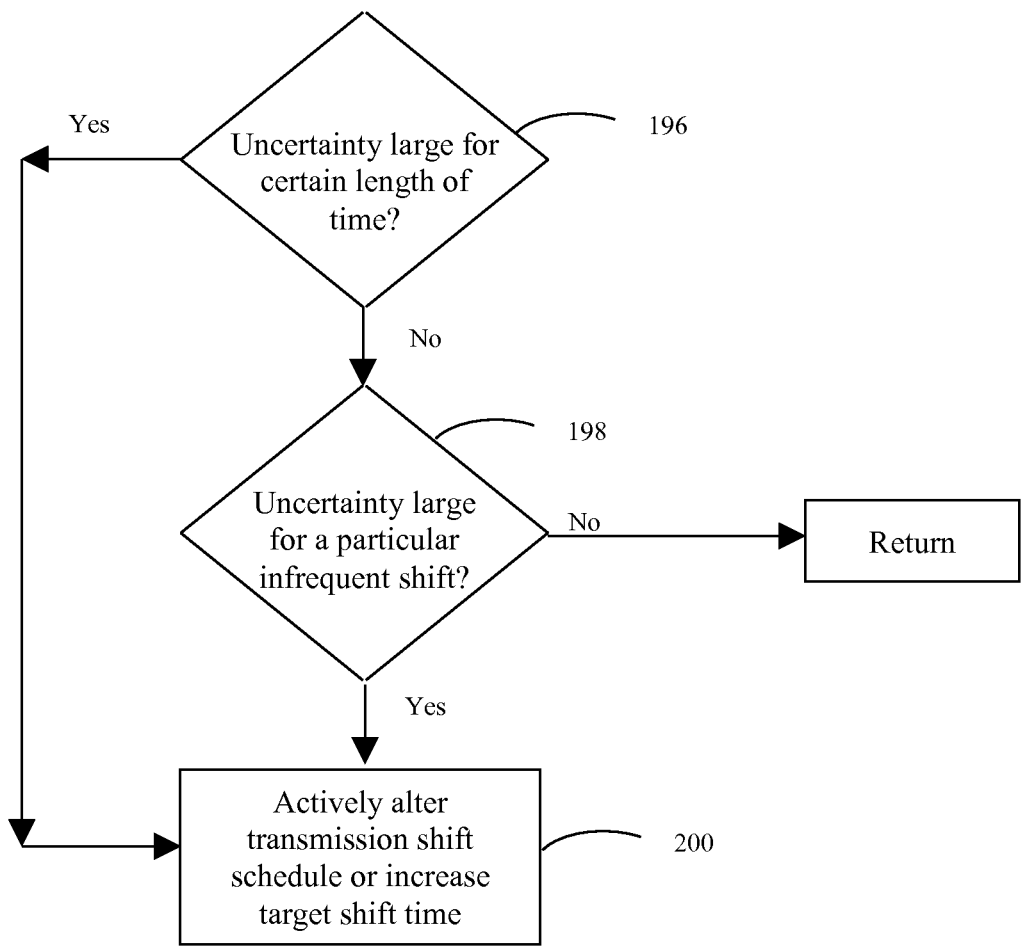
FIG. 11 is a flow chart illustrating another embodiment of estimating and utilizing clutch torque uncertainties.

In certain conditions, an estimated clutch torque might have such a significant amount of uncertainty that it is best to not use it to correct the transfer function model and/or use it for feedback control. Knowing the confidence intervals of the clutch torque estimates is therefore important to closed-loop clutch control. FIGS. 9-11 are described below.

The uncertainty in estimating the clutch torque for a particular shift can be directly estimated as the clutch torque estimator is a linear system. For example, a clutch torque model can be defined by $$Tq_{clutch} = C_{Tq_{input}} Tq_{input} + C_{Tq_{output}} Tq_{output} + C_{\alpha_1}\alpha_1 + \ldots + C_{\alpha_n}\alpha_n$$

where $Tq_{clutch}$ is the clutch torque, $Tq_{input}$ is the input torque, $Tq_{output}$ is the output torque, $a_1 \ldots a_n$ are the accelerations of elements 1 to n and $C_{tqinput}$, $C_{tqoutput}$, $C_{\alpha_1} \ldots C_{\alpha_n}$ are the coefficient of the clutch torque model. This is just one exemplary model which can be used to estimate clutch torques. Other models are discussed herein. Estimating clutch torques using multiple models or calculations is broadly captured at 180. For this particular model, the uncertainty in the estimated clutch torque in terms of a standard deviation σ is illustrated at 182 and can be defined by $$\sigma_{Tq_{clutch}} = ((C_{Tq_{input}}\sigma_{Tq_{input}})^2 + (C_{Tq_{output}}\sigma_{Tq_{output}})^2 + (C_{\alpha_1}\sigma_{\alpha_1})^2 + \ldots + (C_{\alpha_n}\sigma_{\alpha_n})^2)^{0.5}$$

Because the clutch coefficients vary from clutch to clutch and from shift to shift, so too can the uncertainty of the estimated clutch torque. As the uncertainty in the estimated input torque, output torque and accelerations changes, the system can dynamically estimate the uncertainty or confidence of the estimated clutch torque for any clutch and any shift.

Consider the clutch application schedule shown in Table 1 above. When the transmission is locked in $3^{rd}$ gear, clutches 74 and 78 are locked. The clutch torque on clutch 74 could be estimated by: (M1) using the model for the locked $3^{rd}$ gear operation, (M2) using the model for a shift between $2^{nd}$ and $3^{rd}$ gear in which clutch 78 remains locked and clutch 76 and 74 are slipping, or (M3) using the model for a shift between $3^{rd}$ gear and $4^{th}$ gear in which clutch 78 is locked and clutches 74 and 72 are slipping. All three of these methods are valid system representations. If the torque and acceleration terms were known perfectly, then the models would predict the exact same clutch torques. The difference between method M1 compared to methods M2 and M3 is that M1 is derived using two acceleration constraint equations (no net acceleration across clutches 74 and 76) whereas M2 and M3 are derived using only one acceleration constraint equation.

By assuming both clutches 74 and 78 are locked, clutch torque model M1 takes a reduced form which only includes two estimation terms as in:

$$Tq_{clutch,M1} = C_{Tq_{input},M1} Tq_{input} + C_{Tq_{output},M1} Tq_{output}$$

For clutch torque models M2 and M3, only one clutch is assumed to be locked and two clutches are assumed to be potentially slipping. These models would require three estimation terms as in:

$$Tq_{clutch,M2} = C_{Tq_{input},M2} Tq_{input} + C_{Tq_{output},M2} Tq_{output} + C_{\alpha,M2\alpha}$$

$$Tq_{clutch,M3} = C_{Tq_{input},M3} Tq_{input} + C_{Tq_{output},M3} Tq_{output} + C_{\alpha,M3\alpha}$$

When the torque on a clutch can be estimated using multiple means and models, the control system can select which estimated clutch torque has the lowest uncertainty at 184. This clutch torque with the lowest uncertainty can be used as the "true" estimated clutch torque for the remaining transmission controls at 186.

In another embodiment, each of the multiple means and models of estimated clutch torques can be used to quantify the estimated clutch torque uncertainty. For example, the control strategy can use the estimated clutch value with the lowest uncertainty as the "true" estimated clutch torque. The system can then calculate the error between the other estimates and this "true" estimated clutch torque. The magnitude and variation of these errors can be used to estimate the other estimated clutch torque uncertainties.

If the clutch torque uncertainty is higher than a calibratable threshold at 188, the system can choose to not use the estimated clutch torque in feedback controls at 190. If the uncertainty is higher than another calibratable threshold at 192, the system can choose to not use the clutch torque estimate to modify the clutch transfer function at 194.

Another more-active approach to estimating and utilizing clutch torque uncertainties is also contemplated. The system can monitor whether a clutch torque uncertainty is large for an extended period of time at 196 or when a particular shift is infrequently encountered at 198. During these times, the pressure-to-torque transfer function could become outdated and less effective. In these situations, the system may want to actively alter the transmission control logic to identify the clutch transfer function behavior at 200.

One way to alter the transmission control logic includes choosing an alternate shift schedule. For example, if the estimated clutch torque has a high uncertainty for one of the clutches necessary for $3^{rd}$ gear, the transmission logic could perform a shift to $4^{th}$ gear directly from $2^{nd}$ gear during a given driving condition, rather than shifting from $2^{nd}$ gear to $3^{rd}$ gear and then from $3^{rd}$ gear to $4^{th}$ gear during that driving condition. This would obviate a transition into a gear in which clutch torque estimations are uncertain for given driving scenarios.

Another way to alter the transmission control logic includes increasing the target shift time. Longer shifts have slower dynamics. As a result, the uncertainty in the input torque, output torque, and acceleration measurements/estimates will decrease. These lower uncertainties translate into reduced clutch torque uncertainties due to more accurate front-end measurements.

In view of the description above, the accuracy of each measurement and state estimate used within the transmission control system can be quantified, tested, and verified. This process uses a high-quality reference sensor to provide a truth value, and the sensed or estimated value is compared against the truth value. This testing is typically performed across the full range of operating conditions and subjected to numerous noise factors. Multiple hardware units are tested to quantify the part-to-part variation and testing is conducted over long periods to identify the change of time. Depending on the system, the final accuracy can be defined as a percentage (e.g., +/−2%), a fixed range (e.g., +/−10 Nm) or a combination of the two (e.g., whichever is larger +/−2% or +/−10 Nm). A single accuracy metric could be defined or it could be defined as a function of operating condition, temperature, age or any other relevant quantity.

A benefit of estimating clutch torque is the ability to adapt the clutch transfer function between commanded pressure and clutch torque. The clutch torque estimate, however, does not always have the same level of accuracy. The uncertainty in the estimate can vary as a function of gear (or gears during a shift), temperature, load and many other factors. The uncertainty in estimating the clutch torques during a shift from $2^{nd}$ gear to $3^{rd}$ gear, for example, would be much higher during a hard tip-in of a cold soaked vehicle, then it would be for a light constant accelerator pedal shift of a warmed up vehicle. This disclosure provides a method of calculating the uncertainty and a method for including or excluding data for clutch transfer function adaptation.

One challenge with clutch transfer function adaptation is that the behavior of the clutch can change over time. A particular clutch transfer function might become out of date either because the shifts involving that clutch are not frequently encountered, or because when they are encountered the clutch torque estimate has a high uncertainty. To address this situation, the system can actively identify situations when the clutch torque uncertainty would be low and alter the shift schedule so that the clutch with the out-of-date transfer function is included in the shift. Because this shift has a low uncertainty, the clutch torque estimate can be used to adapt the clutch transfer function and improve future shifts involving that clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of operating a transmission comprising:
   operating the transmission according to a first shift schedule for a given driving condition; and
   operating the transmission according to a second shift schedule for the given driving condition in response to a magnitude of uncertainty of estimated clutch torque.

2. The method of claim 1, wherein the step of operating the transmission according to the second shift schedule occurs in response to the magnitude of uncertainty of estimated clutch torque exceeding a threshold for a predetermined time.

3. The method of claim 1, further comprising storing into memory the magnitude of uncertainty of estimated clutch torque while transitioning into a particular gear.

4. The method of claim 3, wherein the second shift schedule includes an avoidance of the particular gear based on the stored magnitude of uncertainty of estimated clutch torque while transitioning into the particular gear.

5. The method of claim 4, wherein the step of operating the transmission according to the first shift schedule includes shifting from a first gear to a second gear to a third gear, and wherein the step of operating the transmission according to the second shift schedule includes shifting from the first gear directly to the third gear.

6. The method of claim 1, further comprising increasing a target shift time between gears based on the magnitude of uncertainty of estimated clutch torque.

7. A method of operating a transmission comprising:
   operating the transmission in a plurality of gears using a plurality of clutches; and
   increasing a shift time between gears based on a calculated uncertainty of estimated clutch torque to reduce the uncertainty of estimated clutch torque.

8. The method of claim 7, wherein the step of increasing includes increasing the shift time between gears in response to the calculated uncertainty of estimated clutch torque exceeding a threshold for a predetermined time.

9. The method of claim 7, further comprising storing the calculated uncertainty of estimated clutch torque while transitioning into a particular gear.

10. The method of claim 9, wherein the step of increasing includes increasing the shift time based on the stored calculated uncertainty of estimated clutch torque while transitioning into the particular gear.

11. The method of claim 7, further comprising altering a shift schedule of the transmission based on the calculated uncertainty of estimated clutch torque.

12. A transmission assembly for a vehicle comprising:
    a transmission having a plurality of clutches configured to selectively operate the transmission in a plurality of gears; and
    a controller programmed to (i) control one or more of the clutches according to a first set of instructions, and (ii) control the one or more clutches according to a second set of instructions in response to a magnitude of uncertainty of estimated clutch torque exceeding a threshold.

13. The transmission assembly of claim 12, wherein the first set of instructions includes a first shift schedule, and the second set of instructions includes a second shift schedule.

14. The transmission assembly of claim 12, wherein the second set of instructions includes an increased target shift time between gears to reduce the uncertainty of estimated clutch torque.

15. The transmission assembly of claim 12, wherein the controller is further programmed to store in memory the magnitude of uncertainty of estimated clutch torque while transitioning into a particular gear.

16. The transmission assembly of claim 15, wherein the second set of instructions includes an avoidance of the particular gear based on the stored magnitude of uncertainty of estimated clutch torque while transitioning into the particular gear.

17. The transmission assembly of claim 16, wherein the first set of instructions causes the transmission to shift from a first gear to a second gear to a third gear, and wherein the second set of instructions causes the transmission to shift from the first gear directly to the third gear.

* * * * *